(12) United States Patent
Globerman et al.

(10) Patent No.: US 12,434,426 B2
(45) Date of Patent: Oct. 7, 2025

(54) DEVICE FOR MAINTAINING THE SHAPE OF CROSS-SECTIONAL PROFILE OF AN ELONGATED ELEMENT INCLUDING COMPOSITE MATERIAL, AND A DEVICE FOR BENDING THEREOF

(71) Applicant: CarboFix Spine Inc, Ocean Isle Beach, NC (US)

(72) Inventors: Oren Globerman, Kfar-Shmaryahu (IL); Mordechay Beyar, Tel Aviv (IL); Daniel Umansky, Kfar Saba (IL)

(73) Assignee: CARBOFIX SPINE INC, Ocean Isle Beach, NC (US)

( * ) Notice: Subject to any disclaimer, the term of this patent is extended or adjusted under 35 U.S.C. 154(b) by 0 days.

(21) Appl. No.: 18/974,878

(22) Filed: Dec. 10, 2024

(65) Prior Publication Data
US 2025/0187255 A1    Jun. 12, 2025

Related U.S. Application Data

(60) Provisional application No. 63/608,363, filed on Dec. 11, 2023.

(51) Int. Cl.
  *B29C 53/08* (2006.01)
  *B29C 53/84* (2006.01)
  *B29L 31/00* (2006.01)

(52) U.S. Cl.
  CPC ............ *B29C 53/84* (2013.01); *B29C 53/083* (2013.01); *B29L 2031/7532* (2013.01)

(58) Field of Classification Search
  CPC ..................................................... B29C 53/083
  See application file for complete search history.

(56) References Cited

U.S. PATENT DOCUMENTS

| | | | | |
|---|---|---|---|---|
| 1,488,698 | A * | 4/1924 | Mumm ................. | A22C 17/14 99/485 |
| 1,877,627 | A * | 9/1932 | Replogle .............. | B31F 1/0032 144/256.3 |
| 2,480,774 | A * | 8/1949 | Rossheim ............. | B29B 13/024 264/339 |
| 2,794,221 | A * | 6/1957 | Bedics .................... | B29C 65/02 156/92 |
| 3,753,635 | A * | 8/1973 | Barnett .................. | B29C 33/36 264/339 |

(Continued)

FOREIGN PATENT DOCUMENTS

| | | |
|---|---|---|
| CN | 1215635 | 5/1999 |
| CN | 2334512 | 8/1999 |

(Continued)

*Primary Examiner* — Andrew D Graham
(74) *Attorney, Agent, or Firm* — PEARL COHEN ZEDEK LATZER BARATZ LLP

(57) ABSTRACT

A device for maintaining a shape of a transverse cross-sectional profile of an elongated orthopedic implant during shaping, which may include: a first and second elongated parts having contacting surfaces, each of the first and second elongated parts including: an outer surface, and an inner surface including: a central concave portion, and two peripheral portions disposed on each side of the central concave portion, each of the two peripheral portions being mirror a half of the central concave portion which is closest to the respective peripheral portion.

12 Claims, 13 Drawing Sheets

(56) References Cited

U.S. PATENT DOCUMENTS

| | | | |
|---|---|---|---|
| 3,952,572 A | | 4/1976 | Mergler |
| 3,992,505 A | * | 11/1976 | Tally ................ B29C 33/76 264/339 |
| 4,218,420 A | * | 8/1980 | Jacob ................ B29C 35/04 425/384 |
| 4,533,512 A | * | 8/1985 | Altman ............... B29C 53/083 264/339 |
| 5,220,818 A | * | 6/1993 | Hansen ............... B29C 53/083 72/217 |
| 5,271,382 A | * | 12/1993 | Chikama ............. A61B 1/0055 138/120 |
| 5,405,073 A | | 4/1995 | Porter |
| 5,475,073 A | | 12/1995 | Guo |
| 5,554,253 A | | 9/1996 | Watanabe |
| 5,765,285 A | * | 6/1998 | Buy .................... B29C 53/083 138/140 |
| 5,862,962 A | * | 1/1999 | Fuchs .................. B29C 53/083 222/464.1 |
| 5,938,662 A | | 8/1999 | Rinner |
| 5,965,082 A | * | 10/1999 | Tietto ................. B29C 49/04 425/534 |
| 5,965,092 A | * | 10/1999 | Chatterjee ......... B01F 33/3039 422/216 |
| 6,309,588 B1 | * | 10/2001 | Powell ................ B29C 53/083 264/339 |
| 6,346,211 B1 | * | 2/2002 | Rafferty .............. B29C 53/083 264/339 |
| 6,855,287 B1 | * | 2/2005 | Anzai ................. B29C 53/083 264/573 |
| 8,298,242 B2 | | 10/2012 | Justis et al. |
| 9,155,492 B2 | | 10/2015 | Jenkins |
| 9,901,705 B2 | | 2/2018 | Armour et al. |
| 2004/0104512 A1 | * | 6/2004 | Eidenschink ...... A61M 25/0009 264/339 |
| 2004/0258789 A1 | * | 12/2004 | Phillips .............. B29C 53/083 425/384 |
| 2004/0267260 A1 | | 12/2004 | Mack et al. |
| 2008/0097509 A1 | * | 4/2008 | Beyar ................ A61B 17/0057 606/191 |
| 2009/0054932 A1 | | 2/2009 | Butler et al. |
| 2009/0326582 A1 | | 12/2009 | Songer et al. |
| 2010/0101295 A1 | | 4/2010 | Miller |
| 2010/0180653 A1 | * | 7/2010 | Wolf ..................... B21F 1/00 72/157 |
| 2010/0318130 A1 | | 12/2010 | Pariato et al. |
| 2011/0259075 A1 | | 10/2011 | Kirchmer |
| 2011/0265538 A1 | | 11/2011 | Trieu |
| 2011/0270262 A1 | | 11/2011 | Justis et al. |
| 2012/0101480 A1 | | 4/2012 | Ingle |
| 2013/0118630 A1 | * | 5/2013 | Readwin ............. B29C 48/00 138/112 |
| 2014/0000337 A1 | * | 1/2014 | Carlo ................... B21D 9/03 72/466.2 |
| 2014/0074141 A1 | | 3/2014 | Johnson |
| 2016/0001039 A1 | | 1/2016 | Armour |
| 2016/0111739 A1 | * | 4/2016 | Takeshita ............ B29C 63/08 138/145 |
| 2016/0346990 A1 | * | 12/2016 | Barrabino .......... B29C 66/1142 |
| 2017/0239877 A1 | | 8/2017 | Lin et al. |
| 2017/0266864 A1 | * | 9/2017 | Steiner .................. B21D 7/02 |
| 2018/0117290 A1 | | 5/2018 | Matlock et al. |
| 2018/0178440 A1 | * | 6/2018 | Gomez Casanova .......... B29C 35/0261 |
| 2020/0138422 A1 | | 5/2020 | Herbert |
| 2020/0139082 A1 | | 5/2020 | Matlock |
| 2020/0331053 A1 | * | 10/2020 | Lan ..................... B29C 53/083 |
| 2022/0048240 A1 | * | 2/2022 | Globerman ........ A61B 17/7011 |
| 2022/0048262 A1 | * | 2/2022 | Dombrowski ...... B29C 53/083 |

FOREIGN PATENT DOCUMENTS

| | | |
|---|---|---|
| CN | 1872441 | 12/2006 |
| CN | 107097401 | 8/2017 |
| JP | 2006150934 | 6/2006 |
| WO | WO-2016/088130 | 6/2016 |

* cited by examiner

800

800

DEVICE FOR MAINTAINING THE SHAPE OF CROSS-SECTIONAL PROFILE OF AN ELONGATED ELEMENT INCLUDING COMPOSITE MATERIAL, AND A DEVICE FOR BENDING THEREOF

CROSS-REFERENCE TO RELATED APPLICATIONS

This application claims the benefit of U.S. Provisional Patent Application No. 63/608,363 filed Dec. 11, 2023, which is hereby incorporated by reference.

FIELD OF THE INVENTION

The present invention relates to the field of devices for curving elongated elements and, more particularly, to devices for curving elongated elements including thermoplastic polymers.

BACKGROUND OF THE INVENTION

An elongated element including thermoplastic polymers must be heated in order to be shaped. Shaping of the heated elongated element may undesirably distort a cross-sectional profile of the elongated element in a shaping region.

SUMMARY OF THE INVENTION

Some embodiments of the present invention may provide a device for maintaining a shape of a transverse cross-sectional profile of an elongated orthopedic implant during shaping, which may include: a first and second elongated parts having contacting surfaces, each of the first and second elongated parts including: an outer surface, and an inner surface including: a central concave portion, and a first and second peripheral portions disposed on opposite sides of the central concave portion, wherein each of the first and second peripheral portions mirrors a half of the central concave portion which is closest to the respective first and second peripheral portion.

In some embodiments, the inner surface of each of the first and second elongated parts includes a first and second ridges disposed on opposite sides of the central concave surface between the central concave surface and the respective first and second peripheral portion.

In some embodiments, the first and second elongated parts contact each other along flat portions of the first and second ridges thereof.

In some embodiments, the central concave portion of the inner surface of each of the first and second elongated parts is configured to support half a perimeter of a transverse cross-sectional profile of the elongated orthopedic implant.

In some embodiments, the first and second elongated parts are configured to support the elongated orthopedic implant between the central concave portions of the inner surfaces thereof.

In some embodiments, the first and second elongated parts are configured to support the elongated orthopedic implant between the central concave portions of the inner surfaces thereof along a whole length of a shaping region of the elongated orthopedic implant.

In some embodiments, the outer surface of each of the first and second elongated parts is flat.

In some embodiments, the device includes a first and second heating elements coupled to the outer surface of the first and second elongated parts, respectively, the first and second heating elements being configured to heat the elongated orthopedic implant supported between the first and second elongated parts.

In some embodiments, the device includes two mesh-like structures disposed on opposed sides of the first and second elongated parts, the two mesh-like structures coupling the first and second elongated parts to hold the first and second elongated parts together.

In some embodiments, each of the two mesh-like structures is at least one of stretchable and bendable during the shaping.

In some embodiments, the device includes a clamp for releasably holding the first and second elongated parts together, the clamp including: two arms pivoting about a central point, the two arms including opposite clamping ends configured to hold the first and second elongated parts together, and a mechanism for changing a distance between the opposite clamping ends of the two arms.

In some embodiments, the device includes a clamp for releasably holding the first and second elongated parts together, the clamp including: two arms movable relative to each other along a longitudinal axis of each of the two arms, the two arms including opposite clamping ends configured to hold the first and second elongated parts together, and a mechanism for changing a distance between the opposite clamping ends of the two arms.

Some embodiments of the present invention may include an apparatus for shaping an elongated orthopedic implant supported by a support device, which may include: a housing including: an interior, and a rail; and three or more sliders, each of the three or more sliders including: a first arm including a clamp, the clamp being disposed within the interior of the housing and being configured to releasably hold the support device supporting the elongated orthopedic implant, and a second arm coupled to the rail of the housing and slidable along the rail, the first arm being movable relative to the second arm along a longitudinal axis that is perpendicular to the rail.

In some embodiments, each of the three or more sliders includes a nut coupled to the first arm and a screw coupled to the second arm of the respective slider.

In some embodiments, each of the three or more sliders includes a guide coupled to the first arm of the respective slider, the guide being configured to support a physical indicator indicating a desired shaping profile of the elongated orthopedic implant.

In some embodiments, the apparatus includes a control unit configured to cause heating elements of the support device to heat the support device and the elongated orthopedic implant supported therein upon activation.

In some embodiments, the control unit is configured to lock a cover of the housing upon the activation.

In some embodiments, the device includes a cooling unit disposed within the interior of the housing, the cooling unit being configured to cool the support device and the elongated orthopedic implant supported therein after the shaping.

Some embodiments of the present invention may provide a method of shaping of an elongated assembly, which may include: providing an elongated assembly, the elongated assembly including: an elongated orthopedic implant including a thermoplastic polymer, and a support device surrounding completely and supporting the elongated orthopedic implant along a whole length of a shaping region in which the elongated orthopedic implant is to be shaped such that the support device maintains a shape and prevent distortion of a transverse cross-sectional profile of the elongated orthopedic implant in the shaping region during shaping upon heating of the elongated orthopedic implant; heating the elongated assembly to provide a heated elongated assembly; shaping the heated elongated assembly according to a desired shaping profile while maintaining the shape and preventing distortion of the transverse cross-sectional profile of the elongated orthopedic implant in the shaping region by the support device; and releasing the support device from the elongated orthopedic implant.

In some embodiments, prior to releasing the support device from the elongated orthopedic implant, the method includes cooling the heated elongated assembly.

BRIEF DESCRIPTION OF THE DRAWINGS

The subject matter regarded as the invention is particularly pointed out and distinctly claimed in the concluding portion of the specification. The invention, however, both as to organization and methods of operation, together with objects, features, and advantages thereof, may best be understood by reference to the following detailed description when read with the accompanying drawings in which:

DETAILED DESCRIPTION OF THE INVENTION

Figure 1:
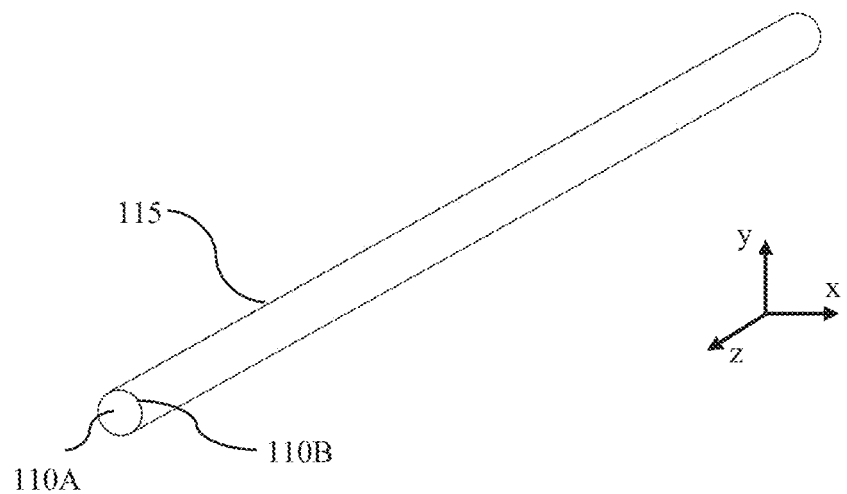
FIG. 1 shows a diagram of an elongated element which may be used with some embodiments of the present invention.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing," "analyzing," "checking," or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items.

Unless explicitly stated, the method embodiments described herein are not constrained to a particular order or sequence. Additionally, some of the described method embodiments or elements thereof can occur or be performed simultaneously, at the same point in time, or concurrently.

Systems and methods of the present invention may improve existing elongated element shaping technology. For example, and without limitation, systems and methods of the present invention may be simpler to use than alternatives, the shaped elongated device may be easier to extract from the device/casing than in alternatives, and the shape of the transverse cross-section of the elongated element may be preserved more effectively than in alternatives.

Generally, devices, systems, kits and methods for shaping of an elongated element are disclosed.

The term "elongated element" as used herein below may relate to any elongated object that may include one or more thermoplastic polymers. For example, the elongated element may include a polyether ether ketone (PEEK) polymer. In another example, the elongated element may include about 60% carbon fibers and about 40% PEEK polymer.

In some embodiments, the elongated element is an orthopedic implant or a part thereof. For example, the elongated element may be any one from a list including an orthopedic rod (e.g., for a pedicle screw assembly), orthopedic plate (e.g., femur plate, humerus plate, etc.), K-Wire, orthopedic nail (e.g., humerus nail, cephalomedullary nail, etc.), etc.

The elongated element including thermoplastic polymer(s) should be heated or pre-heated in order to be shaped. Shaping of the elongated element may be any mechanical action intended to change an initial shape of the elongated element. For example, the shaping may include any or a combination of bending, twisting, stretching and/or compression of the elongated element. The description below provides bending as an example for shaping. It is noted that the devices, systems, kits and methods described below may be also utilized for other types or combination of shaping (e.g., such as twisting, stretching and/or compression).

Shaping a heated elongated element may, for example, distort a cross-sectional profile of the elongated element, for example in a shaping region. For example, when a heated elongated element having an initial circular cross-section (e.g., rod) is being bent, the cross-sectional profile of the elongated element in a bending region may be distorted and may change from circular to, for example, oval or elliptic.

The disclosed devices, systems, kits and methods may allow shaping of the elongated elements including thermoplastic polymers while preventing distortion of the shape of the cross-sectional profile in the shaping region. Furthermore, the disclosed devices and systems may be located in the operation room and may allow shaping of the elongated elements thereof in the operation room during the operational procedure.

One embodiment of the invention may include a support device for maintaining a shape of a transverse cross-sectional profile of an elongated element during a shaping thereof, which may include: two elongated parts, each comprising a heating side (e.g., an outer side or surface) and an elongated element side (e.g., an inner side or surface), wherein the elongated element side of each elongated part may tightly support half a transverse perimeter of the elongated element for substantially the entire length of the elongated element or at least the entire length of the shaping region of the elongated element, wherein the cross section of the elongated element side of each elongated part may include: a central cross-section portion configured to tightly support the half the transverse perimeter of the elongated element, and two peripheral cross-section portions on each side of the central portion which substantially mirror a half of the central cross-section portion which is closest to each respective side. The heating side of each elongated part may be connected, coupled or attached to at least one heating element configured to heat the elongated element during a shaping thereof.

One embodiment of the invention may include an apparatus for shaping an elongated element while maintaining a shape of a transverse cross-sectional profile of the elongated element, wherein the elongated element is contained or supported by the support device according to embodiments of the invention, which may: heat the elongated element and support device by delivering electrical current to the heating element of the support device; shape the elongated element and support device using at least one movable clamp.

FIG. 1 shows an elongated element or rod 105, according to some embodiments of the present invention. It may have and/or be defined by a transverse cross-sectional profile 110B, a transverse perimeter 110A, and a length 115. A transverse perimeter is thus the perimeter of the cross-sectional profile at a given point on the elongated element. The transverse cross-sectional profile is depicted in FIG. 1 as a circle, but may, in fact, be any shape suitable for the function of the elongated element. For example, the transverse cross-sectional profile may have the shape of a circle, an ellipse, a triangle, a square, a pentagon, or a higher order (possibly regular) polygon. The transverse perimeter may form the outline of the shape. The length of the elongated element may be defined in accordance with use requirements of the elongated element, for example, in the case where the elongated element is an orthopedic implant, the length may be, or may be defined by, a bone to which the implant is to be attached. The transverse cross-sectional profile and transverse perimeter may lie in a plane defined by the x and y axis as pictured. Transverse may refer to plane defined by the x and y axis. The length of the elongated element may lie along the z axis. While FIG. 1 shows a substantially straight elongated element, an elongated element may be produced or provided in a pre-shaped or bent form. For example, where the elongated element is an orthopedic implant, it may be provided in a shape based on an average shape of a bone of a number of patients. The pre-shaped form may limit the amount of shaping that must be performed by a user (e.g., a surgeon). In the example of a pre-shaped form, any support device (e.g., the device of FIGS. 2A-6) would also be pre-shaped.

Figure 2A:
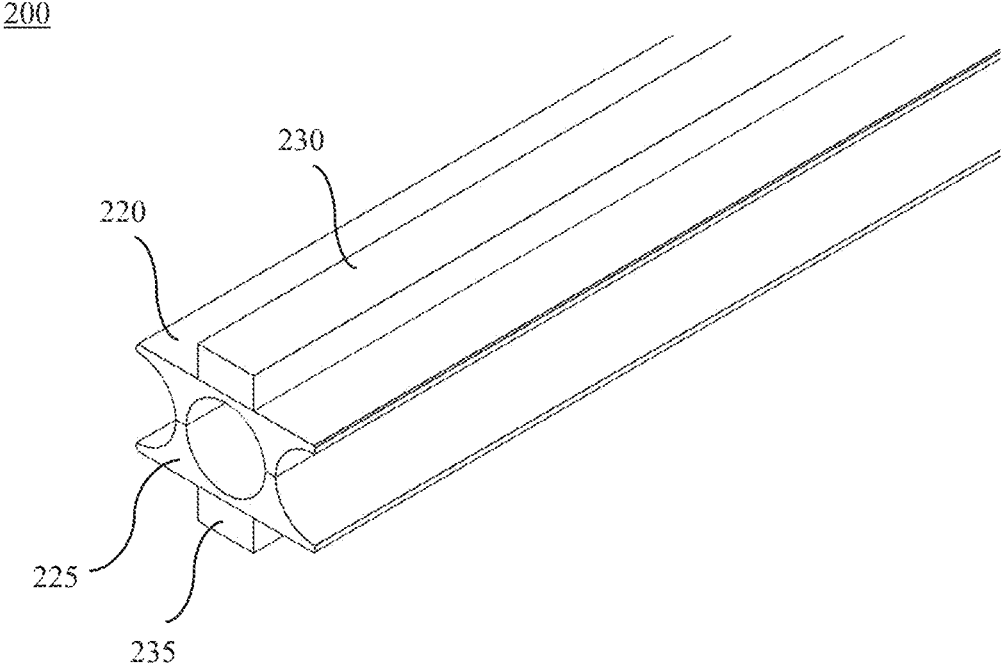
FIGS. 2A and 2B show diagrams of a device for maintaining a shape of a transverse cross-sectional profile of an elongated element, according to some embodiments of the present invention.
Figure 2B:
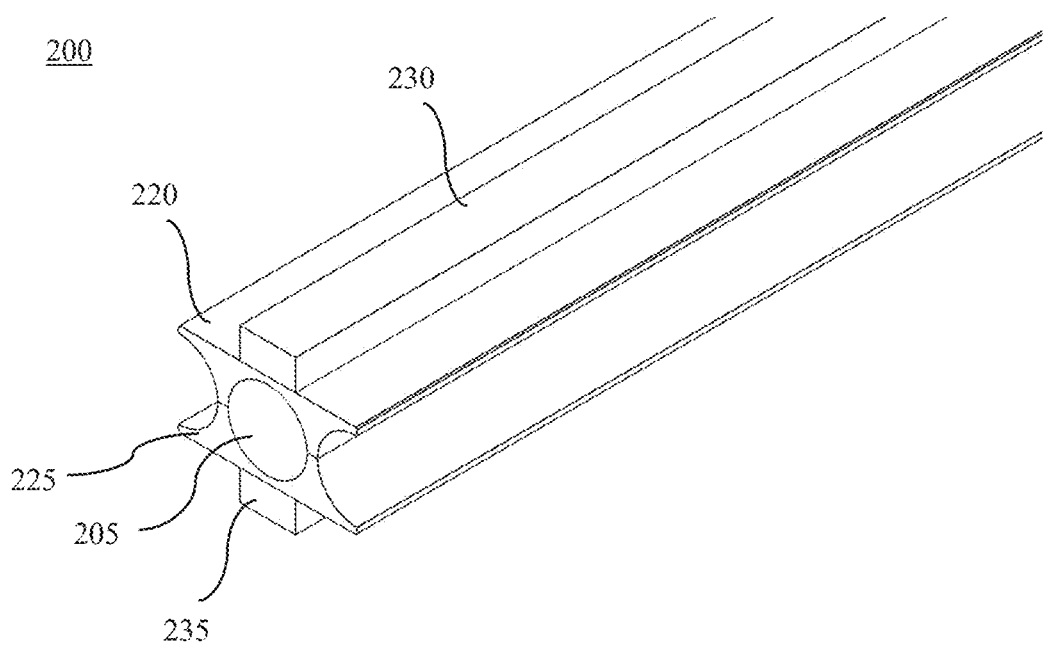
Figure 4:
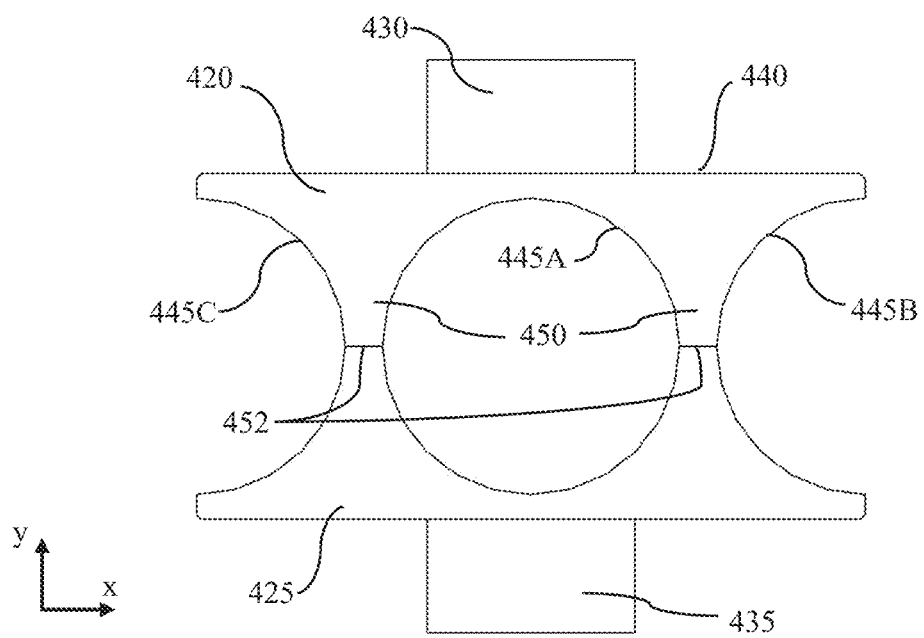
FIG. 4 shows a cross-section diagram of a device for maintaining a shape of a transverse cross-sectional profile of an elongated element, according to some embodiments of the present invention.

FIGS. 2A and 2B show a device 200, according to some embodiments of the present invention, which is suitable for maintaining a shape of a transverse cross-sectional profile of an elongated element 205 during a shaping and/or bending of the elongated element. The device may be called a support device or elongated element support device. FIG. 2A may depict the device 200 without an elongated element, and FIG. 2B may depict the device 200 with an elongated element 205. The device 200 may include the elongated element 205 and/or the device 200 may be suitable to work with the elongated element 205. The device may include a first elongated part 220 and a second elongated part 225. Each of the first elongated part 220 and the second elongated part 225 may include an outer surface and an inner surface (e.g., as indicated in FIG. 4). Each elongated part 220, 225 may take the form of an irregular geometrical prism; e.g., each elongated part may have a substantially constant transverse cross-sectional profile, which may take a shape as described further herein.

The outer surface of each elongated part 220, 225 may be substantially flat. A first heating element 230 and a second heating element 235 may be attached or coupled to the outer surface of the first and second elongated parts 220, 225, respectively. The heating elements 230, 235 may be configured to heat the elongated element 205 prior to or during shaping of the elongated element 205. The heating elements 230, 235 may operate in a number of different ways. The heating elements 230, 235 may include an electrically conductive material configured to heat up when electrical current passes through them. For example, electrical circuit elements may be attached to either end of the heating element 230, 235, and current may be passed through it. In some embodiments, external electromagnetic field may create an electromagnetic field around the heating elements 230, 235, which may induce eddy currents therein, heating the heating element 230, 235. In some embodiments, external electromagnetic field may be created around elongated parts 220, 225 in order to heat them directly without using any heating elements. The elongated parts 220, 225 of the device 200 may be made of a material that does not undergo thermal deformation at a temperature required to shape or bend the heated element 205 (e.g., about 400 degrees Celsius). For example, the device 200 may be made of stainless steel.

The inner surface of each elongated part 220, 225 may include two ridges along the length of the respective elongated part. The inner surface of each elongated part 220, 225 that lies between the ridges, may be suitable for tightly supporting the elongated element. Each elongated part 220, 225 may support half (or substantially half) the transverse perimeter of the elongated element 205 along the whole length of the shaping region of the elongated element 205. Each elongated part 220, 225 may support half (or substantially half) the transverse perimeter of the elongated element 205 along the whole length of the elongated element 205. The elongated parts 220, 225 of the device 200 may surround completely and support the transverse perimeter of the elongated element 205 along the whole length of the shaping region of the elongated element 205 or along the whole length of the elongated element 205.

Figure 3A:
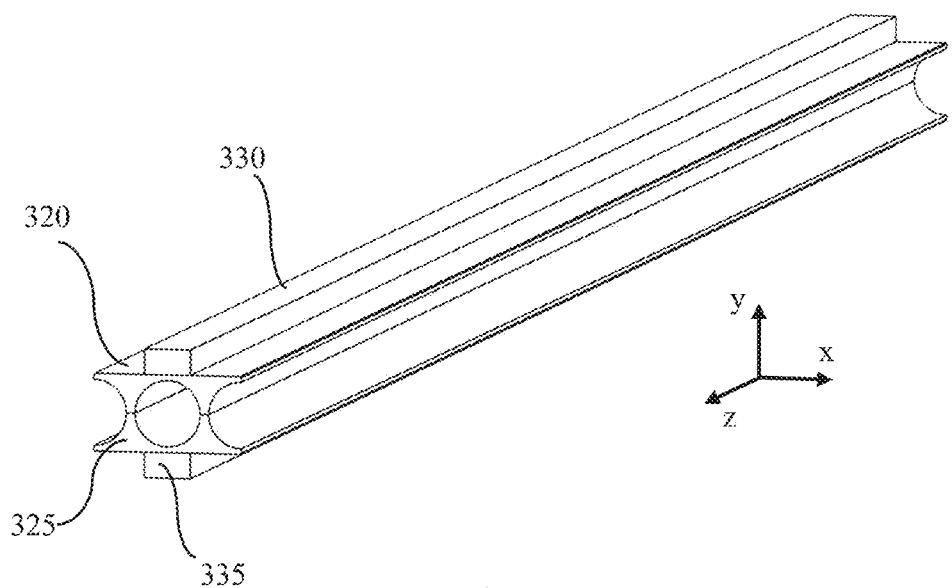
FIGS. 3A and 3B show diagrams of a device for maintaining a shape of a transverse cross-sectional profile of an elongated element, according to some embodiments of the present invention.
Figure 3B:
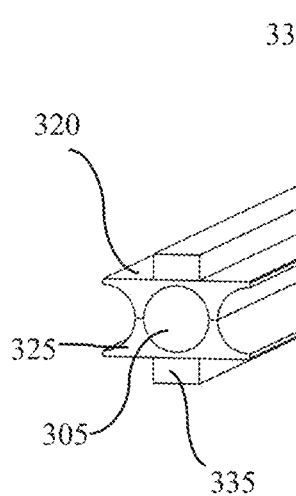

FIGS. 3A and 3B, show a device 300, according to some embodiments of the present invention, which is suitable for maintaining a shape of a transverse cross-sectional profile of an elongated element 305 during a shaping and/or bending of the elongated element. FIG. 3A may depict the device 300 without an elongated element 305, and FIG. 3B may depict the device 300 with an elongated element 305. The device 300 may include a first elongated part 320, a second elongated part 325, a first heating element 330, and a second heating element 335. The device 300 of FIGS. 3A and 3B may be substantially the same as device 200 of FIGS. 2A and 2B. Each part of device 300 may be as described with respect to its corresponding part of device 200. FIGS. 3A and 3B differ from FIGS. 2A and 2B in that they display the whole length of the device.

FIG. 4 shows a transverse cross-sectional profile of a device 400, according to some embodiments of the present invention. The device 400 may be as described in FIGS. 2A-3B. The view of FIG. 4 is of the x-y plane. The device 400 may include first and second elongated parts 420 and 425. There may be an interface 452 between each elongated element 420, 425 at surfaces where the elongated parts 420, 425 are in contact. Each elongated part 420, 425 may include an outer surface 440 and an inner surface 445A, 445B, and 445C. The inner surface may include a central portion 445A and two peripheral portions 445B and 445C on either side of the central portion 445A. The central portion 445A may be concave. The peripheral portions 445B, 445C may be concave. The central portion 445A and each peripheral portion 445B and 445C may be separated by ridges 450 that run the length of the elongated part 420, 425 (the portions may be said to include the surface of the ridges). A surface defined by the central portion 445A and/or both ridges 450 may be shaped to tightly support the elongated element. For example, where the elongated element is substantially cylindrical (i.e., its transverse cross-section is circular), the surface defined by the central portion 445A and ridges 450 may form an indent or channel with a semicircular transverse cross-section. The radius of curvature of said semicircle may be substantially the same as (or only slightly greater than) the radius of the cylindrical elongated element. A surface defined by each of peripheral portions 445B, 445C and/or each corresponding ridge 450 may mirror (or substantially mirror) a half of the central portion 445A which is closest to each respective peripheral portion. For example, with the above example of a semicircular central portion 445A, the surface of each peripheral portion 445B, 445C may be defined by the arc of a quarter circle (e.g., with its open part facing outwards).

The person skilled in the art would not be inclined or taught to include, in existing devices, the mirrored peripheral portions 445B, 445C as laid out here, since their principal advantage is not taught elsewhere, and since they otherwise increase the material requirements of a device. The principal advantage of the mirrored peripheral portions 445B, 445C is that, if the device is bent, with the bend taking place in the y-z plane (e.g., see FIG. 6), then the shape of the transverse cross-sectional profile of each elongated part 420, 425 will be substantially unchanged. Therefore, the shape of the transverse cross-sectional profile of any elongated element held within the central portions 445A of both elongated parts 420, 425 will also be substantially unchanged. The unchanged nature of the transverse cross-sectional profile of each elongated part 420, 425 is due to the fact that the mirrored peripheral portions 445B, 445C mean that internal forces, which could otherwise act to deform the ridges 450 of the elongated part, are balanced due to the substantially symmetrical nature of each ridge 450.

The outer surface 440 of each elongated part may, in some embodiments, be flat (or substantially flat). A first heating element 430 and a second heating element 435 may be attached or coupled to the outer surface 440 of the first and second elongated parts 420, 425, respectively. The heating elements 430, 435 may heat the elongated element during shaping of the elongated element. The heating elements 430, 435 may operate as described elsewhere herein. In FIG. 4 and its corresponding description, various references have been made with respect to the first elongated part 420 only (e.g., inner and outer portions, and ridges), however, said references are also applicable to the second elongated part 425, and have only been omitted here to improve legibility of FIG. 4. The first and second elongated parts 420, 425 may be substantially identical.

Figure 5:
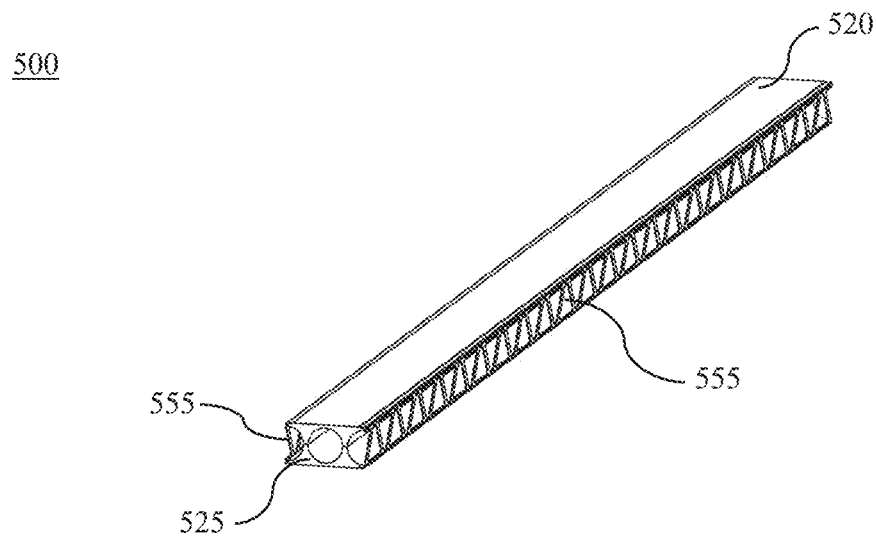
FIG. 5 shows a diagram of a device for maintaining a shape of a transverse cross-sectional profile of an elongated element, according to some embodiments of the present invention.

FIG. 5 shows a device 500, according to some embodiments of the present invention, which is suitable for maintaining a shape of a transverse cross-sectional profile of an elongated element during a shaping and/or bending of the elongated element according to some embodiments of the present invention. The device 500 may be as described in FIGS. 2A-4. The device may include first and second elongated parts 520 and 525. These elongated parts 520 and 525 may be attached or coupled to heating elements (not pictured).

The device may include a temporary attachment mechanism 555. One example of a temporary attachment mechanism 555 is a long mesh-like structure, constructed of, for example, a metal foil. This mesh-like structure may be attached to the sides of the device. It may be stretchable or bendable, such that it does not disrupt bending of the device during use, and it may be easily removable after bending (e.g., it may be pulled off or cut by a user). In the example of FIG. 5, the temporary attachment mechanism 555 includes two mesh-like structures disposed on each side of the first and second elongated parts 520 and 525.

In some embodiments, it may be preferable to provide a temporary attachment mechanism to keep or hold the elongated parts 520, 525 in contact during bending, and thus to ensure that the transverse cross-sectional profile of the elongated element is preserved. The temporary attachment mechanism may be released after the bending is complete to decouple the elongated parts 520 and 525 and allow releasing of the elongated element from the device 500. In other embodiments, a temporary attachment mechanism is not required.

Figure 6:
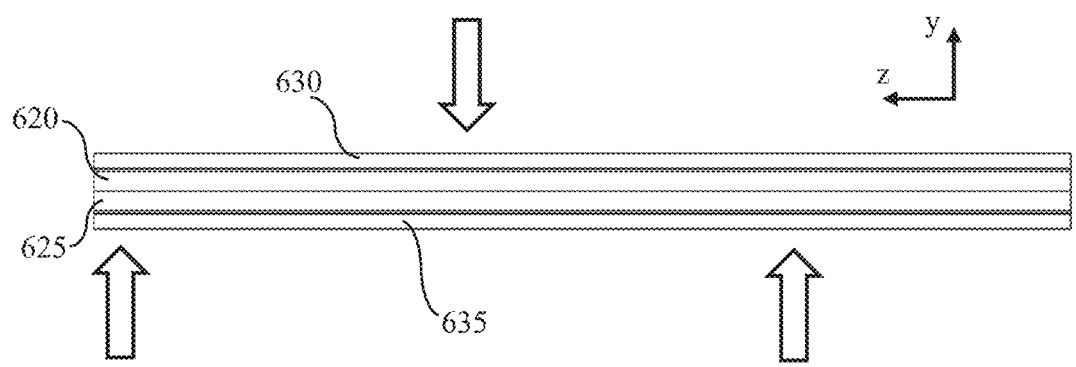
FIG. 6 shows a side-view diagram of a device for maintaining a shape of a transverse cross-sectional profile of an elongated element, according to some embodiments of the present invention.

FIG. 6 shows an example indicating how an elongated element may be shaped or bent, according to some embodiments of the present invention. The view of FIG. 6 is of the y-z plane. The device may include first and second elongated parts 620 and 625, and first and second heating elements 630 and 635. The device may be as described in FIGS. 2A-5. The arrows of FIG. 6 give examples of forces that may be applied to the elongated element during bending or shaping. In some embodiments, the forces applied to the elongated element may lie in a plane of the page; the forces may lie in the y-z plane. In some embodiments, there be substantially no forces in the x axis (e.g., sec x axis in FIG. 4).

Figure 7:
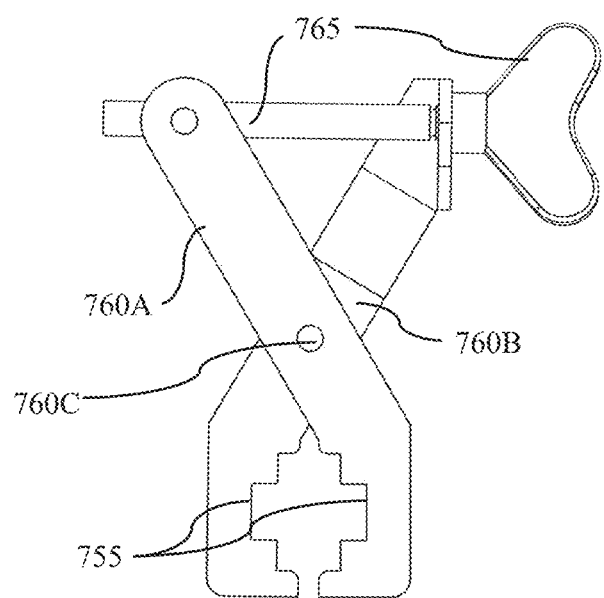
FIG. 7 shows a diagram of a clamp which may be used with some embodiments of the present invention.

FIG. 7 shows an example of means (e.g., clamp) 700 for holding the elongated parts of the device (e.g., the device of FIGS. 2A-6) together, according to some embodiments of the present invention. The embodiment of FIG. 7 may be referred to as a scissor clamp. It may include two arms 760A and 760B which pivot around a central point 760C, and a mechanism 765 for changing a displacement (e.g., a distance) between one end of each arm, and thereby changing, in an opposite manner, a displacement between an opposite end of each arm (e.g., to allow positioning and release of the device from the clamp 700). Said mechanism 765 for changing displacement may, in some embodiments, include a screw and a nut (or similar), and (optionally) a handle. Said opposite ends of each arm may include an opening with ridges 755 suitable for holding the device (e.g., for holding the elongated parts of the device in contact, for example during shaping).

Figure 8A:
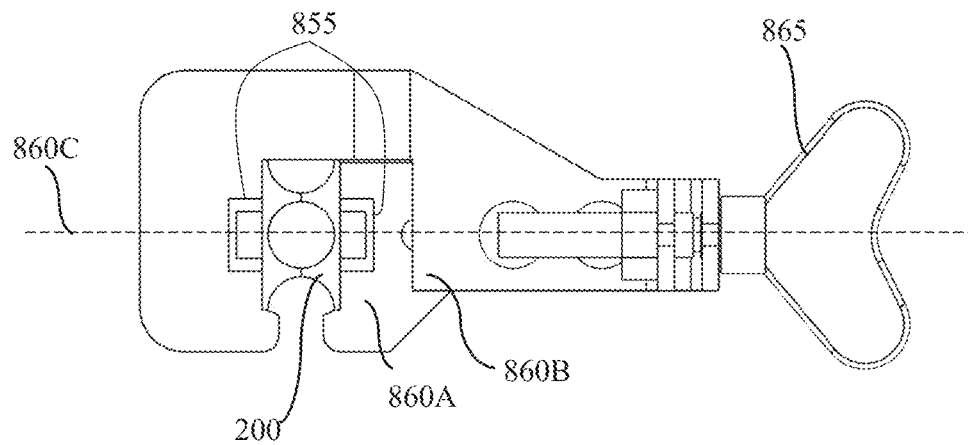
FIGS. 8A and 8B show diagrams of a clamp which may be used with some embodiments of the present invention.
Figure 8B:
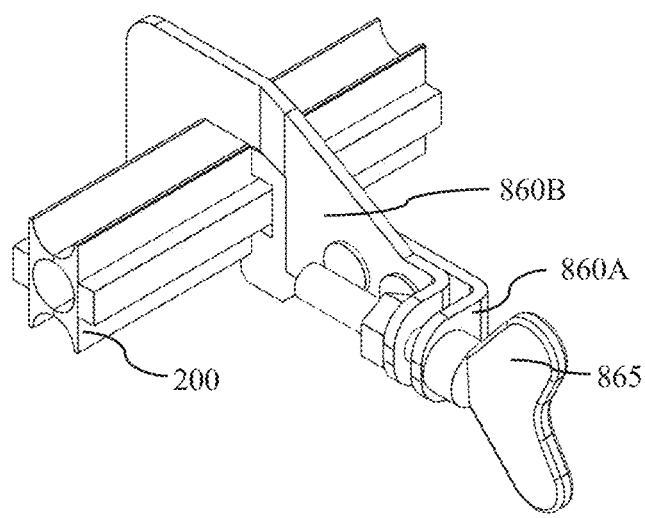

FIGS. 8A and 8B show an alternative example of means (e.g., clamp) 800 for holding the elongated parts of the device 200 (e.g., the device of FIGS. 2A-6) together, according to some embodiments of the present invention. The embodiment of FIGS. 8A and 8B may be referred to as a G-clamp. It may include two arms 860A and 860B movably affixed to each other, such that they may move relative to each other along a longitudinal axis 860C of each arm. The clamp 800 for holding the device may include a mechanism 865 for changing a displacement (e.g., distance) between the clamping ends of each arm (e.g., to allow positioning and release of the device). Said mechanism 865 for changing displacement may, in some embodiments, include a screw and a nut (or similar), and (optionally) a handle. Said opposite clamping ends of each arm 860A and 860B may include an opening with ridges 855 suitable for holding the device (e.g., for holding the elongated parts of the device in contact, for example during shaping).

One or more clamps 700, 800 may be used to keep or hold the elongated parts of the support device (e.g., the device of FIGS. 2A-6) in contact during bending, and thus to ensure that the transverse cross-sectional profile of the elongated element is preserved. The clamps 700, 800 do not disturb the bending of the support device and the elongated element. The clamps 700, 800 may be easily removable or releasable after the bending to allow removing the elongated parts of the support device away from one another and releasing of the elongated element from the support device.

Figure 9A:
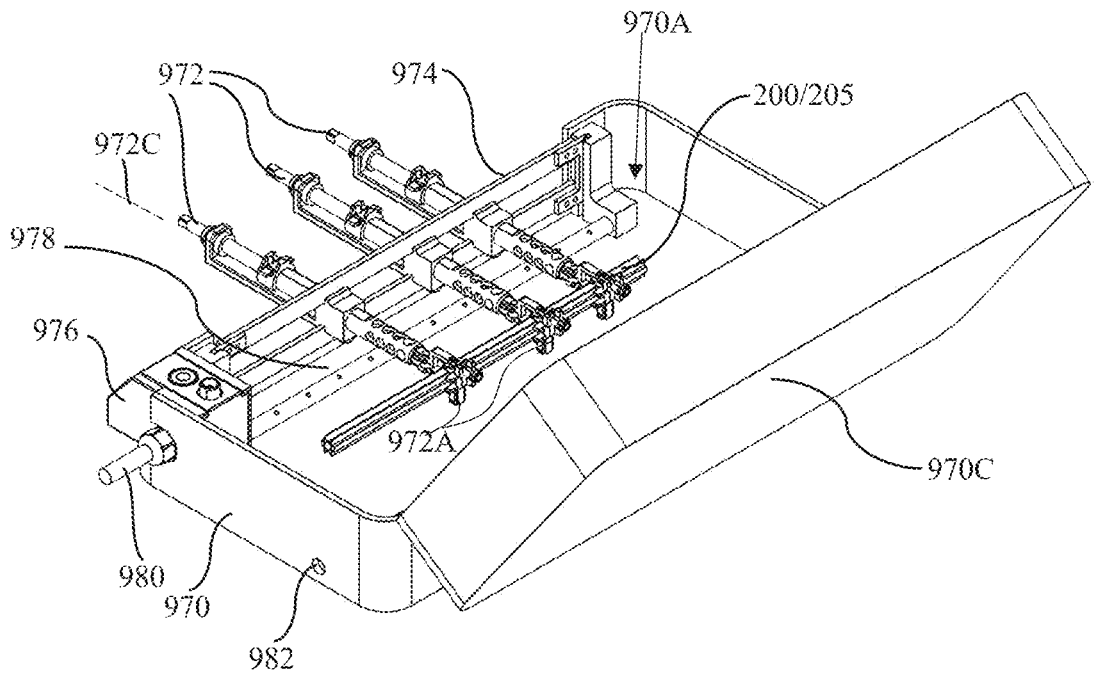
FIGS. 9A, 9B, and 9C show diagrams of an apparatus for bending or shaping an elongated element while maintaining a shape of a transverse cross-sectional profile of the elongated implant, in accordance with some embodiments of the present invention.
Figure 9B:
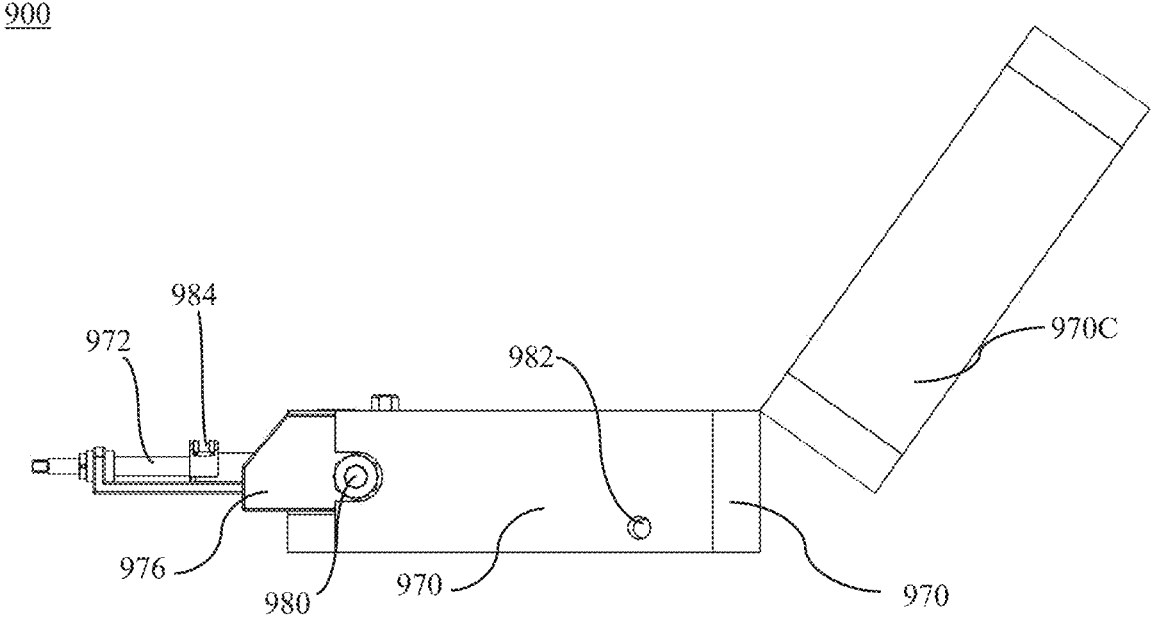
Figure 9C:
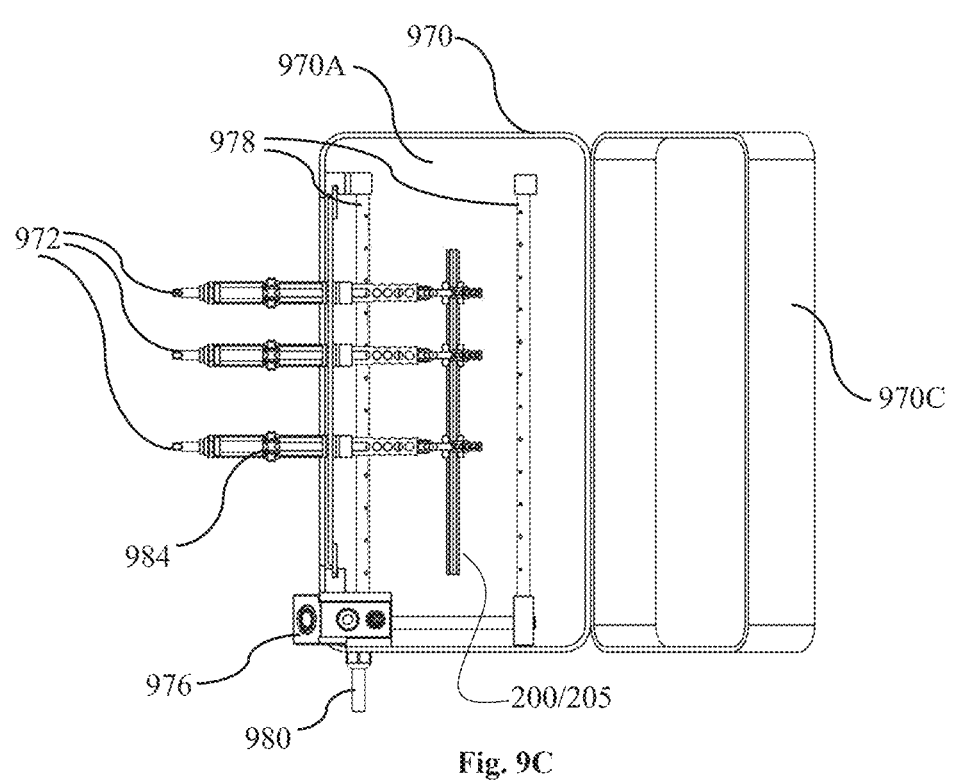

FIGS. 9A, 9B, and 9C show an apparatus 900, according to some embodiments of the present invention, for bending or shaping an elongated element 205 while maintaining a shape of a transverse cross-sectional profile of the elongated implant 205, and wherein the elongated element 205 is included or encompassed within a support device 200 (e.g., the device of FIGS. 2A-6). The apparatus 900 may include a housing 970. The housing 970 may protect a user from high temperatures and/or electric shock during use. The apparatus 900 may include at least one slider 972. The slider 972 may be configured to hold the support device 200. For example, one end of the slider 972 may include an adjustable opening or a clamp 972A with ridges suitable for holding (e.g., releasably holding) the supporting device 200. The clamp 972A may be disposed within an interior 970A of the housing 970. Another part of the slider 972 may be attachable or attached to the housing 970 via a rail 974, wherein the slider 972 may be moved along the rail 974 as required. When the support device 200 is installed within the apparatus 900 (e.g., in an unbent form), one may describe the rail 974 as lying parallel to the support device 200 (e.g., parallel to the z axis). The slider 972 may be attached to the rail 974, such that the longitudinal axis of the rail 974 and the longitudinal axis 972C of the slider 972 are perpendicular (or substantially perpendicular) to one another. In some embodiments, at least three sliders 972 are installed or attached to the apparatus 900. The sliders 972 may include guides 984. The guides 984 may be helpful if a physical indicator of the required shape (e.g., of the desired shaping or bending profile) of the elongated element is available. The physical indicator may be aligned with the guides 982 of multiple sliders 972, and as such, the user may be informed as to whether the elongated element is of the correct shape. The guides 982 may support the physical indicator.

The apparatus 900 may include a control unit 976. The control unit 976 may be configured to heat the heating element of the support device, for example, when an input has been received and/or when the housing 970 is closed (e.g., the cover 970C of the housing 970 has latched to a body of the housing). Heating elements of the support device 200 may comprise an electrically conductive material configured to heat up when electrical current passes through them. Current may be provided to the heating elements in different ways. For example, electrical circuit elements (not depicted) may be manually or automatically attached to either end of each heating element from the control unit 976, and current may be passed through it. The current may be provided by the control unit 976. Alternatively, electromagnets attached to the housing elements (not depicted) may be configured to create a magnetic field around the heating elements, which may induce eddy currents therein, heating the heating element (induction heating). Current may be provided to the electromagnets by the control unit 976. Other means of heating the heating elements may also be readily contemplated by the person skilled in the art. Connection 980 may provide power/current from an external source (e.g., a mains power socket) to the control unit 976.

The apparatus 900 may include a cooling unit 978. Some embodiments may not use a cooling unit. In some embodiments, incorporating the cooling unit 978 may be preferable in order that an elongated element and its support device may be cooled down more rapidly. The cooling unit 978 may operate in a number of ways. For example, the cooling unit 978 may utilize air cooling and blow air on to the support device and elongated element (e.g., as depicted). Some versions of air cooling units may utilize an air intake 982 and/or air outtake vent (not depicted). An air intake and/or air vent may increase the speed of cooling. Alternatively, air cooling units may utilize internal fans. Alternatively, liquid cooling systems may be used. In embodiments different cooling techniques may be combined.

Figure 10A:
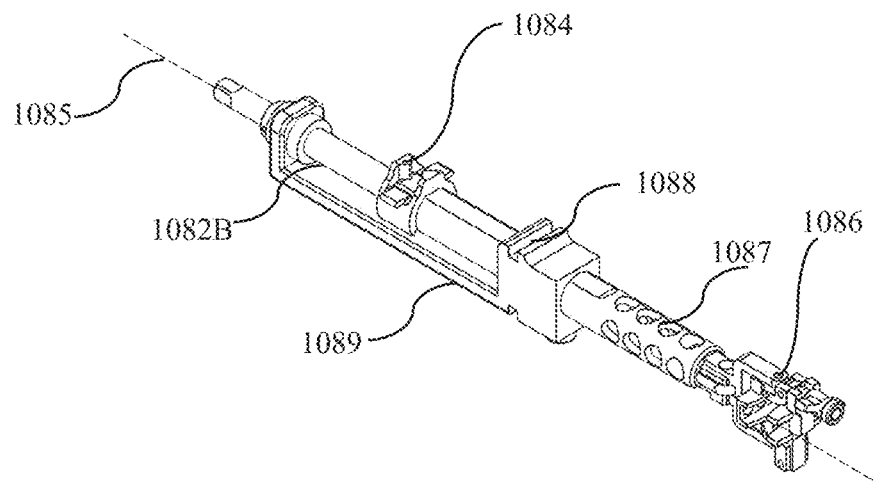
FIGS. 10A, 10B and 10C show diagrams of a movable clamp according to some embodiments of the invention.
Figure 10B:
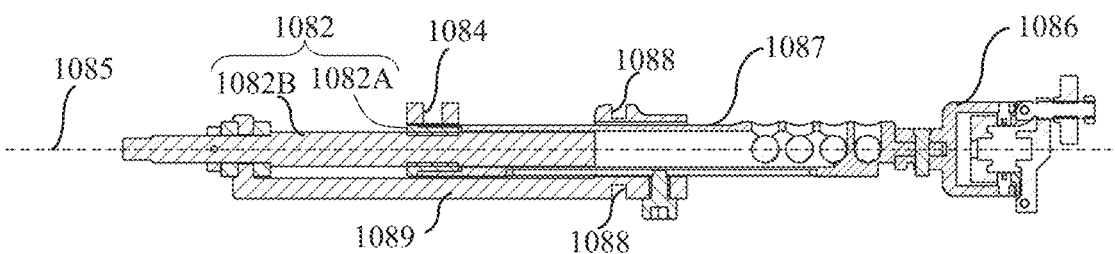
Figure 10C:
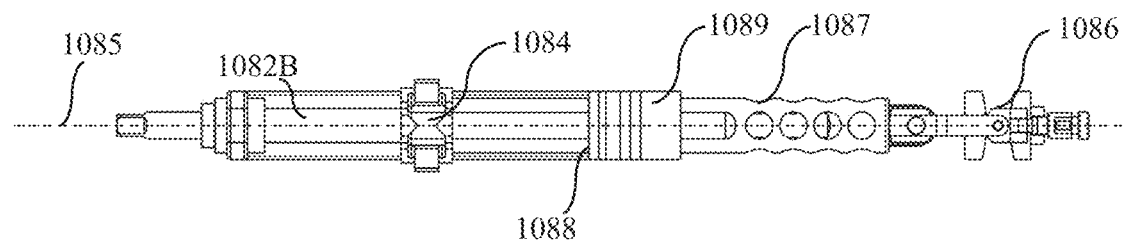

FIGS. 10A, 10B and 10C show a slider 1072 according to some embodiments of the present invention. The slider 1072 may be configured to hold the support device. One end of the slider 1072 may include an adjustable opening or clamp 1086 with ridges or an opening shape suitable for holding (e.g., releasably holding) the support device (e.g., the device of FIGS. 2A-6). The slider 1072 may also include a rail attachment 1088, which may be attachable or attached to the housing 970 via rail 974, wherein the slider 1072 may be moved along the rail 974 as required.

The slider may include two arms 1087 and 1089 movably affixed to each other, such that they may move relative to each other along a longitudinal axis 1085 of each arm. One arm may be configured to move in and out of the other, for example, in the manner of a piston. A first arm 1087 may include the adjustable opening or clamp 1086. A second arm 1089 may include the rail attachment 1088. The slider 1072 may include a mechanism 1082 for changing a relative displacement between each arm (e.g., using screw and nut and/or pistons and/or servo motors). In some embodiments, the mechanism 1082 may be controlled by the control unit. In some embodiments, the mechanism 1082 may be manually operated (e.g., by a user). In the example of FIGS. 10A-10C, the mechanism 1082 may include a nut 1082A coupled to the first arm 1087 and a screw 1082B coupled to the second arm 1089 (e.g., as depicted in FIG. 10B). Rotation of the screw 1082B may cause the nut 1082A move along the screw 1082B and cause the first arm 1087 move with respect to second arm 1089 and the housing 970.

The slider 1072 may include a guide 1084. The guide 1084 may be part of or attached to the first arm 1087. Therefore, the guide 1084 may give a relative indication of the position of the adjustable opening or clamp 1086 (e.g., relative to other guides 1084 of other sliders 1072). The guide 1084 may be helpful if a physical indicator of the required shape of the elongated element is available. The physical indicator may be aligned with the guides 1084 of multiple sliders 1072, and as such, the user may be informed as to whether an elongated element held in the slider 1072 is of a desired shape.

Figure 11:
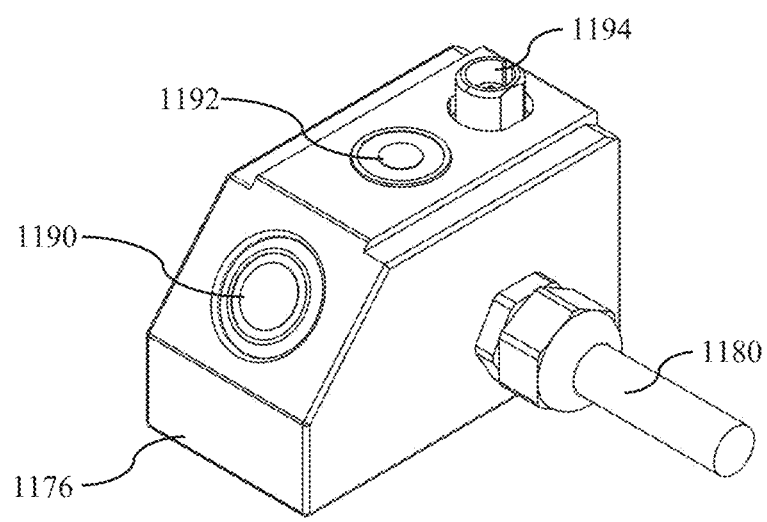
FIG. 11 shows a diagram of a control unit which may be used with some embodiments of the present invention.

FIG. 11 shows a control unit 1176, according to some embodiments of the present invention. The control unit 1176 may include a user input and/or output 1190. For example, this may include buttons, monitors, touch screens, lights, etc. The control unit 1176 may include a power input 1180. The control unit 1176 may include electromagnet or alternative unit 1192 to lock a covering 970C of the housing 970 (depicted in FIGS. 9A-9C) during the hot period of the process. The control unit 1176 may include connector 1194, which may, for example, be connected via electrical cables (not depicted) to heating elements, thermometer, clamps, sensor, electromagnets, and/or any internal device or component that requires power/current.

In operation, the support device (e.g., the device of FIGS. 2A-6) supporting the elongated element may be coupled within the interior 970A of the housing 970 of the apparatus 900 using clamps 972A, 1086 of the sliders 972, 1072. The position of the sliders 972, 1072 along the rail 974 may be adjusted according to a desired shaping or bending profile of the elongated element. The guides 984, 1084 and/or the physical indicator of the desired bending profile may be used to adjust the positions of the sliders 972, 1072 along the rail 974. The cover 970C of the housing 970 may be closed. The apparatus 900 may be turned on using, for example, the user input 1190. Upon activation, the control unit 976, 1176 may lock the covering 970C of the housing 970 by the unit 1192. The control unit 976, 1176 may cause (e.g., as described hereinabove) the heating elements of the support device to heat the support device and the elongated element supported therein. The control unit 976, 1176 may indicate using the user output 1190 that the heating of the elongated element is complete and that the elongated element has reached a desired temperature (e.g., 360-400 degrees Celsius). The control unit 876, 1176 may stop cause the heating elements of the support device to stop the heating. The position of the clamps 972A, 1086 of the sliders 972, 1072 may be adjusted or changed to bend the heated support device and the heated elongated element supported by the support device to the desired bending profile. The guides 984, 1084 and/or the physical indicator of the desired bending profile may be used to adjust the positions of the clamps 972A, 1086 of the sliders 972, 1072. For example, the physical indicator may be a deformable template that may have shape and dimensions similar to the shape and dimensions of the elongated element. The physical indicator may be deformed (e.g., manually deformed by the user) to fit a target anatomical zone and indicate the desired shaping or bending profile. The position of the sliders 972, 1072 and/or the position of the clamps 972A, 1086 of the sliders 972, 1072 may be then adjusted based on the deformed physical indicator with the assistance of the guides 984, 1084. The control unit 976, 1176 may turn on the cooling unit 978 to cool the support device and the elongated element. Once the cooling is complete (e.g., when the temperature of the support device and the heating element is below a temperature threshold), the control unit 976, 1176 may release the cover 970C of the housing 970. The cover 970C may be opened and the bended support device with the bended elongated element may be released from the clamps 972A, 1086 of the sliders 972, 1072. The bended elongated parts of the support device may be removed away from one another and the bended elongated element may be released from the support device.

Figure 12A:
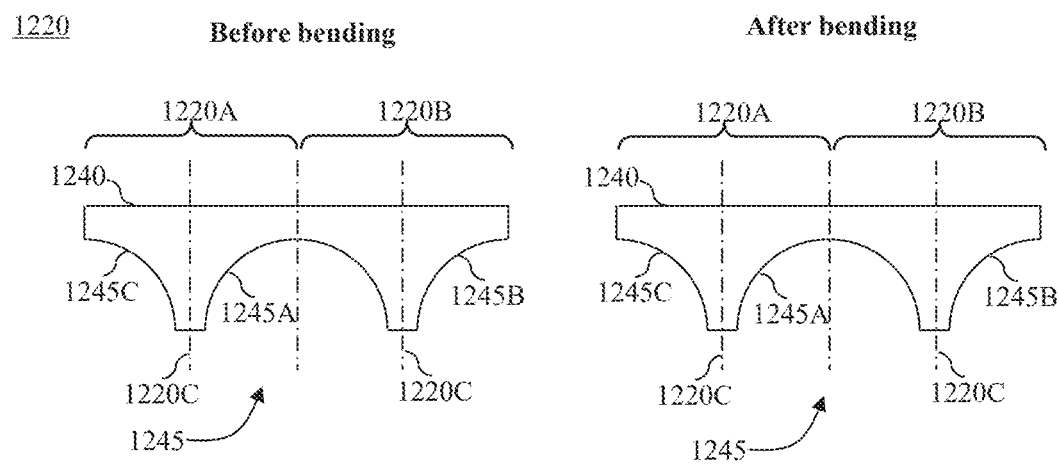
FIG. 12A shows a cross-section diagram of an elongated part of a device for maintaining a shape of a transverse cross-sectional profile of an elongated element, before and after bending, according to some embodiments of the present invention.

FIG. 12A shows a transverse cross-sectional profile of an elongated part 1220 (e.g., such as the elongated parts 420, 425) of a support device (e.g., such as the support device 400) before and after pending, according to some embodiments of the present invention. The elongated part 1220 may include an outer surface 1240 and an inner surface 1245. The outer surface may be flat.

The inner surface 1245 may include a central portion 1245A and two peripheral portions 1245B and 1245C on either side of the central portion 1245A. The central portion 1245A may be concave. The peripheral portions 1245B, 1245C may be concave. The central portion 1245A and each peripheral portion 1245B and 1245C may be separated by ridges 1250 that run the length of the elongated part 1220. The peripheral portions 1245B, 1245C of the inner surface 1245 of the elongated part 1220 may mirror (or substantially mirror) a half of the central portion 1245A of the inner surface 1245 which is closest to each respective peripheral portion. For example, with the example of a semicircular central portion 1245A of the inner surface 1245 of FIG. 12A, the peripheral portion 445B, 445C of the inner surface 1245 may be defined by the arc of a quarter circle (e.g., with its open part facing outwards).

Accordingly, each ridge 1250 or each half 1220A, 1220B of the elongated part 1220 may be symmetric (or substantially symmetric) with respect to or about its symmetry line 1220C. The symmetrical nature of each half 1220A, 1220B of the elongated part 1220 may balance the internal forces within the halves 1220A, 1220B during bending and thereby prevent distortion of and maintain the shape of the cross-sectional profile of the halves 1220A, 1220B and of the entire elongated part 1220 during bending or shaping. Therefore, the shape of the transverse cross-sectional profile of any elongated element held within between the elongated parts such as the elongated part 1220 will also be maintained (or substantially maintained).

Figure 12B:
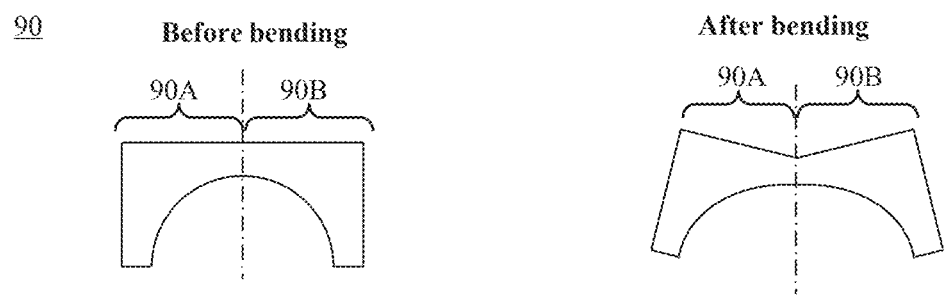
FIGS. 12B and 12C show cross-section diagrams of elongated parts which are not capable of maintaining a shape of a transverse cross-sectional profile of an elongated element, before and after bending.
Figure 12C:
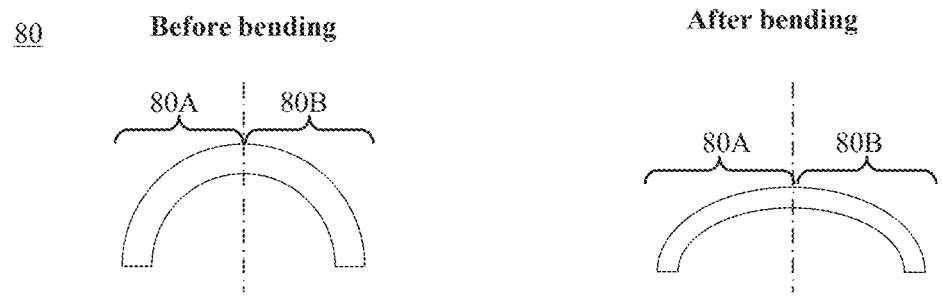

FIGS. 12B and 12C show cross-section diagrams of elongated parts 90, 80 which are not capable of maintaining a shape of a transverse cross-sectional profile of an elongated element, before and after bending. Unlike the elongated part 1220 in which each half 1220A, 1220B of the elongated part 1220 is symmetric with respect to or about its symmetry line 1220C, which balances internal forces during bending or shaping (e.g., as described above), the halves 90A, 90B of the elongated part 90 and the halves 80A, 80B of the elongated part 80 have no such line of symmetry. Therefore, the internal forces within the halves 90A, 90B of the elongated part 90 and the halves 80A, 80B of the elongated part 80 are not balanced during bending or shaping. Such unbalanced internal forces cause distortion of the cross-sectional profile of the halves 90A, 90B of the elongated part 90 and the halves 80A, 80B of the elongated part 80 during bending or shaping. Therefore, the shape of the transverse cross-sectional profile of any elongated element held within between the elongated parts such as the elongated part 80, 90 will also be distorted.

Figure 13:
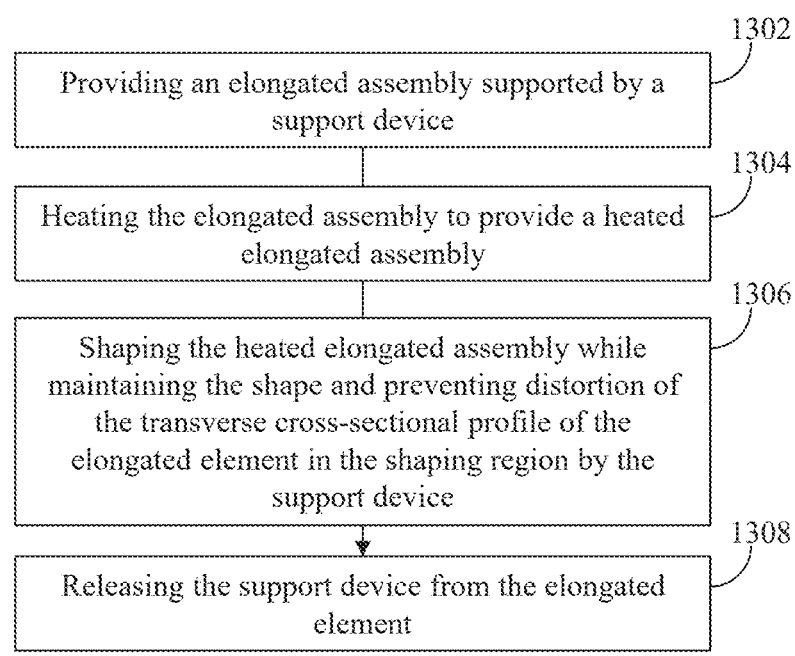
FIG. 13 shows a flowchart of a method of shaping of an elongated element, according to some embodiments of the invention.

FIG. 13 shows a flowchart of a method of shaping of an elongated element, according to some embodiments of the invention.

In operation 1302, an elongated assembly including an elongated element (e.g., such as the elongated element 105, 205, 305) disposed within a support device (e.g., such as the support device 200, 300, 400, 500, 600) may be provided. The elongated element may include a thermoplastic polymer. The elongated element may include a shaping or bending region in which the elongated element may be bent or shaped. The support device may surround completely and support the elongated element along the whole length of the shaping or bending region of the elongated element. The support device may maintain a shape and prevent distortion of a transverse cross-sectional profile of the elongated element in the shaping or bending region during shaping or bending upon heating of the elongated element.

In operation 1304, the elongated assembly may be heated to provide a heated elongated assembly (e.g., heated elongated element and heated support device) (e.g., as described above). The elongated assembly may be heated by heating elements of the support device.

In operation 1306, the heated elongated assembly may be shaped or bent by a shaping or bending apparatus (e.g., such as the apparatus 900) to provide a shaped or bent elongated assembly, while maintaining the shape and preventing distortion of the transverse cross-sectional profile of the elongated element in the shaping or bending region by the support device. The shaped or bent elongated assembly may include a shaped or bent elongated element having a desired shaping or bending profile supported by a shaped or bent support device.

In operation 1308, the shaped or bent support device may be released from the shaped or bent elongated element. Prior to release, the bent elongated assembly may be cooled.

In some or all of the above-described embodiments, the components, devices, and/or apparatuses therein may be sterilized or may be capable of being sterilized. Said components, devices, and/or apparatuses may be constructed of materials suitable for a sterilization process, for example, metals, such as stainless steel or titanium, or plastics, such as a PEEK polymer. Sterilization may take place through any suitable method known in the art, e.g., by heat, chemicals, filtration, or radiation.

Systems and methods of the present invention may improve existing elongated element shaping technology. For example, systems and methods of the present invention may be simpler to use than alternatives, the shaped elongated device may be easier to extract from the device/casing than in alternatives, the shape of the transverse cross-section of the elongated element may be preserved more effectively than in alternatives, etc.

Different embodiments are disclosed herein. Features of certain embodiments may be combined with features of other embodiments; thus, certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A device for maintaining a shape of a transverse cross-sectional profile of an elongated orthopedic implant during shaping, the device comprising:
 a first and second bendable elongated parts having contacting surfaces, each of the first and second elongated parts comprising:
  an outer surface, and
  an inner surface comprising:
   a single central concave portion, and
   a first and second peripheral portions disposed on opposite sides of the single central concave portion, wherein each of the first and second peripheral portions:
    mirrors a half of the single central concave portion which is closest to the respective first and second peripheral portion, and
    comprises an open part facing outwards of the device,
  wherein each of halves of a cross-sectional profile of the respective elongated part is symmetric.

2. The device of claim 1, wherein the inner surface of each of the first and second elongated parts comprises a first and second ridges disposed on opposite sides of the central concave surface between the central concave surface and the respective first and second peripheral portion.

3. The device of claim 2, wherein the first and second elongated parts contact each other along flat portions of the first and second ridges thereof.

4. The device of claim 1, wherein the central concave portion of the inner surface of each of the first and second elongated parts is configured to support half a perimeter of a transverse cross-sectional profile of the elongated orthopedic implant.

5. The device of claim 1, wherein the first and second elongated parts are configured to support the elongated orthopedic implant between the central concave portions of the inner surfaces thereof.

6. The device of claim 1, wherein the first and second elongated parts are configured to support the elongated orthopedic implant between the central concave portions of the inner surfaces thereof along a whole length of a shaping region of the elongated orthopedic implant.

7. The device of claim 1, wherein the outer surface of each of the first and second elongated parts is flat.

8. The device of claim 1, comprising a first and second heating elements coupled to the outer surface of the first and second elongated parts, respectively, the first and second heating elements being configured to heat the elongated orthopedic implant supported between the first and second elongated parts.

9. The device of claim 1, comprising two mesh structures disposed on opposed sides of the first and second elongated parts, the two mesh structures coupling the first and second elongated parts to hold the first and second elongated parts together.

10. The device of claim 9, wherein each of the two mesh structures is at least one of stretchable and bendable during the shaping.

11. The device of claim 1, comprising a clamp for releasably holding the first and second elongated parts together, the clamp comprising:
   two arms pivoting about a central point, the two arms comprising opposite clamping ends configured to hold the first and second elongated parts together.

12. The device of claim 1, comprising a clamp for releasably holding the first and second elongated parts together, the clamp comprising:
   two arms movable relative to each other along a longitudinal axis of each of the two arms, the two arms comprising opposite clamping ends configured to hold the first and second elongated parts together.

* * * * *